(12) United States Patent
Hoffmann et al.

(10) Patent No.: US 10,255,241 B2
(45) Date of Patent: Apr. 9, 2019

(54) SYSTEM FOR CUSTOMIZING SPECIFIC DATABASE MODELS USING SPECIFIC DATABASE VIEWS

(71) Applicants: Martin Hoffmann, Heidelberg (DE); Martin Erdelmeier, Shifferstadt (DE); Stefan Linkersdoerfer, Wiesloch (DE)

(72) Inventors: Martin Hoffmann, Heidelberg (DE); Martin Erdelmeier, Shifferstadt (DE); Stefan Linkersdoerfer, Wiesloch (DE)

(73) Assignee: SAP SE, Walldorf (DE)

( * ) Notice: Subject to any disclaimer, the term of this patent is extended or adjusted under 35 U.S.C. 154(b) by 1088 days.

(21) Appl. No.: 14/056,491

(22) Filed: Oct. 17, 2013

(65) Prior Publication Data

US 2015/0113025 A1    Apr. 23, 2015

(51) Int. Cl.
| | | |
|---|---|---|
| *G06F 17/30* | (2006.01) | |
| *G06F 16/25* | (2019.01) | |
| *G06F 16/11* | (2019.01) | |
| *G06F 16/21* | (2019.01) | |

(52) U.S. Cl.
CPC .......... *G06F 16/252* (2019.01); *G06F 16/128* (2019.01); *G06F 16/213* (2019.01)

(58) Field of Classification Search
USPC ........ 707/607, 609, 687, 705, 790, 813, 821
See application file for complete search history.

(56) References Cited

U.S. PATENT DOCUMENTS

| | | | |
|---|---|---|---|
| 6,058,391 A * | 5/2000 | Gardner | ............ G06F 17/30595 |
| 6,167,406 A | 12/2000 | Hoskins et al. | |
| 6,823,373 B1 | 11/2004 | Pancha et al. | |
| 7,577,912 B2 | 8/2009 | Govindan et al. | |
| 7,702,696 B2 | 4/2010 | Ziegler et al. | |
| 7,822,714 B2 | 10/2010 | Chen et al. | |
| 8,121,874 B1 * | 2/2012 | Guheen | ................ G06Q 10/063 |
| | | | 705/7.11 |
| 8,326,889 B2 | 12/2012 | Kaesermayr | |
| 8,356,009 B2 | 1/2013 | Ellard et al. | |
| 8,468,179 B1 | 6/2013 | Rosenwald et al. | |
| 2003/0204523 A1 | 10/2003 | Leck | |
| 2005/0278542 A1 * | 12/2005 | Pierson | ............... H04L 63/0876 |
| | | | 713/182 |
| 2006/0112130 A1 | 5/2006 | Lowson | |
| 2008/0052310 A1 | 2/2008 | Rangadass | |

(Continued)

FOREIGN PATENT DOCUMENTS

WO    WO-2001046846 A1    6/2001

*Primary Examiner* — Sana A Al-Hashemi

(74) *Attorney, Agent, or Firm* — Schwegman Lundberg & Woessner, P.A.

(57) ABSTRACT

A computer system is operable to receive a plurality of database tables from a plurality of clients, and store the database tables. The system permits a user to create a plurality of views for the database tables. Each of the plurality of views includes a plurality of fields. The system associates the plurality of views with a generic application, and presents to a user one or more configuration options. The configuration options include the plurality of fields. The system permits a user to define a generic field role for one or more of the plurality of fields. Finally, the system executes the generic application using the configuration options selected by the user and the defined generic field roles to create a user interface for a particular client.

20 Claims, 10 Drawing Sheets

(56) References Cited

U.S. PATENT DOCUMENTS

2012/0296692 A1* 11/2012 O'Malley ......... G06Q 10/0635
　　　　　　　　　　　　　　　　　　　705/7.28
2013/0159259 A1　6/2013　Hobbs
2013/0191328 A1　7/2013　Hackmann et al.

* cited by examiner

| DIALOG STRUCTURE | | |
|---|---|---|
| ∨ 📁 INVESTIGATION OBJECT TYP | DETECTION OBJECT TYPE | FRA_SCLAIM |
| • 📁 DATA ENRICHMENT FIEL | | |
| ∨ 📁 DETECTION OBJECT TYPES | DETECTION OBJECT TYPES | SUB CLAIM |
| • 📁 SELECTION FIELDS | INVESTIGATION OBJECT TYPE | FRA_CLAIM |
| • 📁 ASSOCIATION TO INVEST | HANA DB SELECTION VIEW PACKAGE NAME | SAP.HANA-APP.FRA.CM.DT |
| | HANA DB SELECTION VIEW NAME | CA_ICLSUBCL_DET_OBJ |
| | CALIBRATION PREVIEW SIZE | |

Fig. 2

| DIALOG STRUCTURE | DETECTION OBJECT TYPE | | | | FRA_SCLAIM | | |
|---|---|---|---|---|---|---|---|
| ∨ 🗀 INVESTIGATION OBJECT TYP | | | | | | | |
| • 🗀 DATA ENRICHMENT FIEL | SELECTION FIELDS | | | | | | |
| ∨ 🗀 DETECTION OBJECT TYPES | SELECTION FIELD | KEY | KEY ORDER | | SELECTION FIELD | | TEMPORAL SELECTION |
| • 🗀 SELECTION FIELDS | CLAIM | ☑ | 1 | ✓ | ☐ | | ☐ |
| • 🗀 ASSOCIATION TO INVEST | CREATEDATE | ☐ | | ✓ | ☐ | | ☑ |
| | LOSSTYPE | ☐ | | ✓ | ☑ | | ☐ |
| | PLINEOFBUS | ☐ | | ✓ | ☑ | | ☐ |
| | POLPROD | ☑ | 2 | ✓ | ☐ | | ☐ |
| | SUBCLAIM | | | | | | |

*Fig. 3*

| DIALOG STRUCTURE | | DETECTION OBJECT TYPE | FRA_CLAIM |
|---|---|---|---|
| ∨ ☐ INVESTIGATION OBJECT TYP | | | |
| • ☐ DATA ENRICHMENT FIEL | | DETECTION OBJECT TYPES | |
| ∨ ☐ DETECTION OBJECT TYPES | | INVESTIGATION OBJECT TYPE DESCRIPTION | CLAIM |
| • ☐ SELECTION FIELDS | | SOURCE DOMAIN | INSURANCE |
| • ☐ ASSOCIATION TO INVEST | | HANA DB ENRICHMENT VIEW PACKAGE NAME | SAP.HANA-APP.FRA.CM.DT |
| | | HANA DB ENRICHMENT VIEW NAME | CA_ICLCLAIM_INV_OBJ |

*Fig. 4*

DIALOG STRUCTURE
- ∨ ☐ INVESTIGATION OBJECT TYP[E]
  - • ☐ DATA ENRICHMENT FIEL[DS]
- ∨ ☐ DETECTION OBJECT TYPES
  - • ☐ SELECTION FIELDS
  - • ☐ ASSOCIATION TO INVEST[IGATION]

| INVESTIGATION OBJECT TYPE | FRA_CLAIM | | | | |
|---|---|---|---|---|---|
| DATA ENRICHMENT FIELDS | | | | | |
| INVESTIGATION OBJECT ENRICHMENT FIELD | KEY | KEY ORDER | ACCESS GROUP | ADDITIONAL ID 1 | ADDITIONAL ID 2 |
| CLAIM | ☑ | 1 | | | |
| DATELOSS | ☐ | ∨ | ☐ | ☐ | ☐ |
| LOSSTYPE | ☐ | ∨ | ☐ | ☐ | ☑ |
| OWNER_GRP | ☐ | ∨ | ☑ | ☑ | ☐ |
| PLINEOFBUS | ☐ | ∨ | ☐ | ☐ | ☐ |
| POLICY_HOLDER | ☑ | ∨ | | | |

| DIALOG STRUCTURE | DETECTION OBJECT TYPE | FRA_SCLAIM |
|---|---|---|
| ∨ 📁 INVESTIGATION OBJECT TYP | | |
| • 📁 DATA ENRICHMENT FIEL | ASSOCIATION TO INVESTIGATION OBJECT TYPE | |
| ∨ 📁 DETECTION OBJECT TYPES | HANA DB ASSOCIATION VIEW PACKAGE NAME | HANA DB ASSOCIATION VIEW NAME |
| • 📁 SELECTION FIELDS | SAP.HANA-APP.FRA.CM.DT | CLAIM_SUBCLAIM_LINK |
| • 📁 ASSOCIATION TO INVEST | | |

*Fig. 6*

| GENERAL | SELECTION PARAMETERS | DETECTION METHODS | ADMINISTRATION DATA | TECHNICAL INFORMATION |

INCIDENT TYPE > IS NOT EMPTY > (+)(−)
LINE OF BUSINESS > IS NOT EMPTY > (+)(−)
POLICY PRODUCT > IS > CALIBR ▢ (+)(−)

Fig. 7

SYSTEM FOR CUSTOMIZING SPECIFIC DATABASE MODELS USING SPECIFIC DATABASE VIEWS

TECHNICAL FIELD

The present disclosure relates to a system for customizing specific database models (of a particular industry or client) using specific database views.

BACKGROUND

A software vendor or developer may develop a software product or system that may be of interest and use to many different clients and industries. The software product will use the specific data or databases of a particular client or industry as input, process that data, and then generate usable output via readily understandable user interfaces. However, each different client or industry has different database structures, different data formats within those structures, and different data. The software vendor has to be aware of these differences among clients or industries, and account for these differences in some way.

BRIEF DESCRIPTION OF THE DRAWINGS

FIG. 2 is an example user interface for defining a detection object type in an example fraud management system.

FIG. 3 is an example user interface for the configuration of generic roles for detection object type view fields in an example fraud management system.

FIG. 4 is an example user interface for customizing investigation object types in an example fraud management system.

FIGS. 5A and 5B are an example user interface for configuring generic roles for an investigation object type view fields in an example fraud management system.

FIG. 6 illustrates an example user interface for mapping key fields of an investigation object to detection objects in an example fraud management system.

FIG. 7 illustrates an example user interface wherein a user can filter selection fields per detection object type in an example fraud management system.

DETAILED DESCRIPTION

Figure 1:
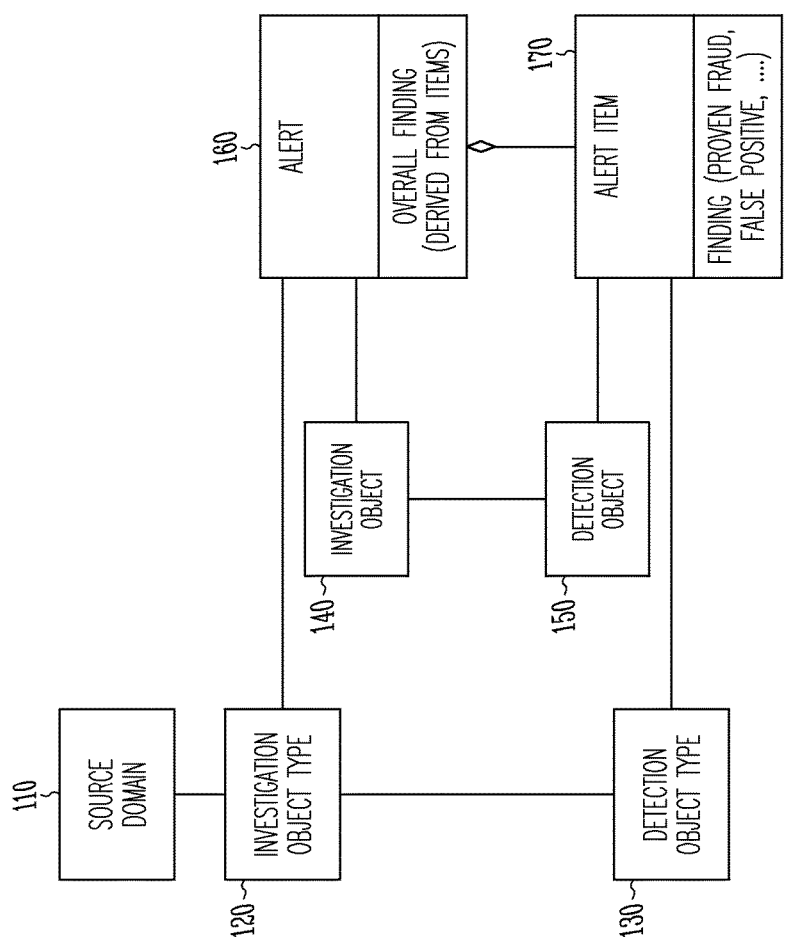
FIG. 1 is a block diagram of an example fraud management system.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

As noted above, when a software vendor or developer creates a software system that may be of interest to many different types of clients, businesses, or industries, each different client or industry more than likely has data that are stored in different database structures and different data formats within those structures. The software vendor has to be aware of these differences among clients and industries, and has to account for these differences in some way. In an embodiment, one way of accounting for these differences among industries or clients is to develop a generic solution that can be used by all of the different clients and industries. The generic solution is then aware of, and accounts for, the different data structures and formats of the different clients and industries.

It is noted that in lieu of a generic solution (that is, instead of mapping an industry-specific data model), one could possibly implement different industry-specific applications using the database tables directly. However, there is a higher development cost associated with this, since the coding of the solution needs to be adapted for each specific industry. Also, instead of creating database views (for a generic application) and entering the database views into a customizing/configuration of the generic application, one could replicate the data from the client-specific or industry-specific source system into the application database in a way that certain predefined tables are filled. The application could then work on these tables directly, and neither the coding of the solution nor the customizing/configuration would need to be adapted. However, with this approach, it is technically impossible to replicate the data from the source system in a way that data from more than one source table is inserted into one predefined generic table. In this case there would be more predefined tables needed for a generic application for possible source tables, and join conditions would need to be hard-coded into the application. This would lead to much higher cost of development and would again make the application more industry-specific.

Consequently, instead of implementing different industry-specific applications directly using database tables, and instead of replicating data from a client-specific or industry-specific source system into an application database in a way that certain predefined tables are filled, a generic application with database views is implemented in a specific embodiment. When implementing a generic solution that can be used for different client-specific or industry-specific data models, there are different options with different costs and benefits during the development and/or the implementation of the solution at the customer side. For example, when developing an application comprised of a database server and an application server (amongst other components), where certain entries in database tables are processed on request of the application server and the results are further processed in the application server, the application server must be made aware of the data model. To let users administer the database processing (e.g., filter for certain table entries), and control the output on the user interface (UI), certain database table attributes have to be given special roles (e.g., a selection field and a key field). To successfully implement this in a generic manner, this must be done in a way that permits many different clients or industries to use the software system. However, the development and maintenance costs should not be excessive.

For example, the software vendor may offer a fraud management product. Such a fraud management product would be of interest to many industries, including the insurance industry (to identify and prevent insurance fraud). The fraud management system could run on the software vendor's server and databases, and execute different rules (stored procedures) inside the database engine. In an embodiment, the database could be an in-memory database, such as the SAP HANA® in-memory database. Administrative information about the rules, triggering of the rules processing, limiting of the input objects per table for the different rules, etc. are executed via business objects in the server. Also the result of each rule is processed in the server. As noted, the fraud management product can be used in many different industries, each with a different database model and different tables. For a particular client or industry to use the fraud management product, those different database models and database tables are replicated to the software vendor's database.

In light of this, there must be some mechanism that handles the client-specific or industry-specific database tables in the application server for further processing, including presentation logic for the user interface layer. For different tables, the application server needs to be aware of certain things. First, in order to allow a user to limit the number of rows of a database table that are processed in a rule or a set of rules, the application server needs to be made aware of certain columns that can be used as filters. These so-called selection fields are shown to the user, and the resulting information can be used in a SQL WHERE-clause at runtime. Second, entries of other tables can be used to visualize the results of the rules for one object. The application server needs to be made aware of these different data enrichment fields, their order, and their data types, and these different data enrichment fields need to be correctly displayed in the user interface. Third, since data from other tables might be necessary for the user interface and the data enrichment fields, a mapping of key fields is needed in case there is no foreign key constraint on the database level.

In light of the above, in an embodiment, the development of a generic application using client-specific or industry-specific database tables is implemented by permitting a user/administrator to execute the following steps. As a first step, the source database tables of the client or industry are replicated into the software vendor's database. In an embodiment, the vendor software database is an in-memory database, such as SAP's HANA® database. As a second step, a certain number of database views for the source tables are created. These views can join the information from different tables. In an embodiment, the number of views is fixed. As a third step, the created industry-specific database views are entered into a generic customizing/configuration of the application server. As a fourth step, for each of the fields of the database views, generic field roles are defined.

The generic application on the application server needs to give the user a configuration/customizing option to enter the individual views, and to set the role of each field in these views in terms of the generic data model (of the generic application). Also, the generic application needs to be developed in a way that it reads the customizing/configuration entries of each part of the generic data model, so it does not need to know about the industry-specific data model. The configuration needs to be read when creating user interfaces and during other processing in the application server.

FIG. 1 is a block diagram of an example embodiment of a fraud management system. FIG. 1 illustrates that the fraud management system includes two generic objects in the application's data model—the fraud investigation object type 120 (and its associated investigation object 140) and the detection object type 130 (and its associated detection object 150)—for which two views on replicated data from the source domain 110 need to be built for each industry-specific data model. As a consequence of the building of these views, more than one industry-specific data model can be used inside the same generic application server. In the alert item module 170, an overall finding is made regarding an incident, such as whether fraud has been proven or whether the incident is a false positive. The alert module 160 makes an overall fraud finding based on many items. The alert module 160 and alert item module 170 deal with local data, that is, the data of the specific client or industry. The investigation object 140 and detection object 150 provide a view on the replicated data (from source domain 110 to the software vendor's database). The investigation object type 120 and the detection object type 130 relate to metadata and other customizing.

FIG. 2 illustrates a user interface that can be used in a customizing activity for a specific client or specific industry data model (in the fraud management example). In the customizing activity for the data model, the detection object type 130 is defined by entering the specific database view and, as illustrated in FIG. 3, selecting the roles of each view field in the application (key field, selection field (used to filter the processed entries), temporal selection field (temporal filter)).

FIG. 4 is an example user interface for customizing investigation object types in an example fraud management system. In the customizing activity for investigation object types 120, a view with investigation objects 140 is entered and the roles for the all view fields are specified (e.g., key field, additional data fields, access group (to control authorizations)).

Figure 5B:
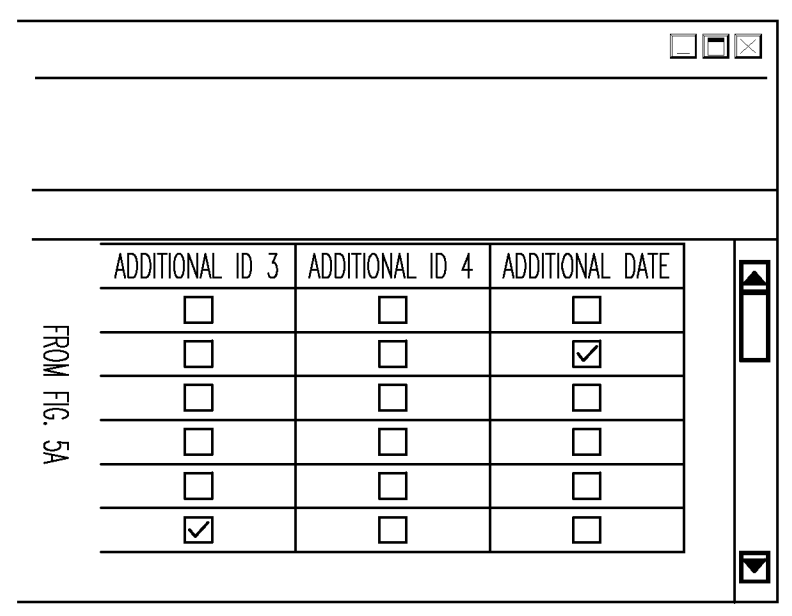

FIGS. 5A and 5B are an example user interface for configuring generic roles for investigation object type view fields in an example fraud management system. Since there is a 1:n relationship between investigation objects 140 and detection objects 150, and the key fields of the investigation objects need not be available in the detection object view, a third database view is entered where a mapping of the key fields of investigation object to detection objects takes place, as is illustrated in FIG. 6.

FIG. 1 also illustrates the entities Alert 160 and Alert Item 170, which are implemented as business objects in the generic server and are created using the replicated data. The selection fields per detection object type are evaluated at runtime, and as illustrated in FIG. 7, a user can filter table entries in a user interface. Specifically, as illustrated in FIG. 7, a user can use the selection fields of LOSSTYPE, PLINEOFBUS, and POLPROD to limit the table entries that are processed.

Figure 8:
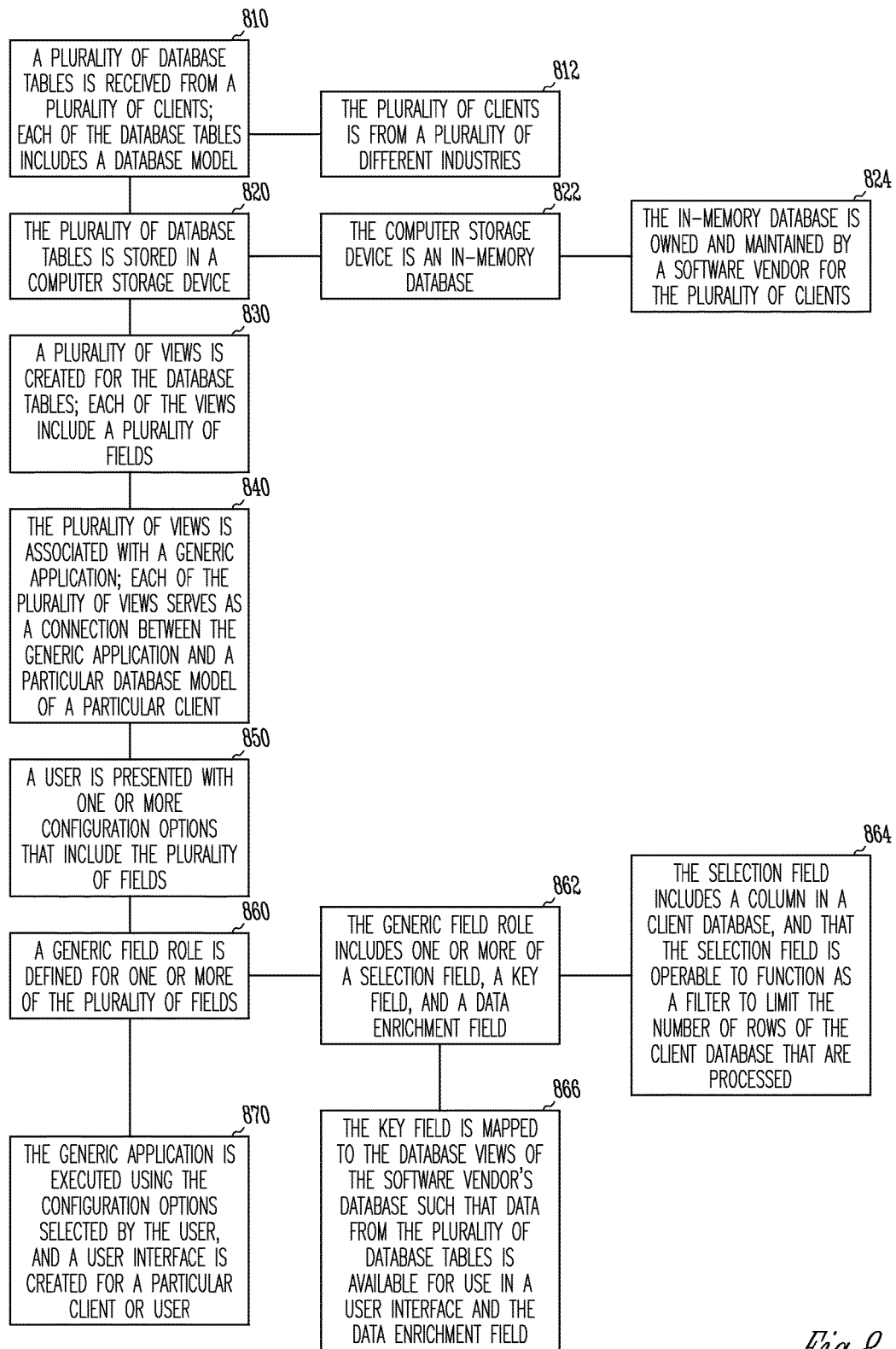
FIG. 8 is a block diagram illustrating operations and process steps of a system for customizing specific database models using specific database views.

FIG. 8 is a block diagram illustrating operations and process steps of a system and method for customizing specific database models using specific database views. FIG. 8 includes a number of process blocks 810-870. Though arranged serially in the example of FIG. 8, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 8, a computer processor in a computer system is configured and operable to execute the following. At 810, a plurality of database tables is received from a plurality of clients. Each of the database tables includes a database model. As noted at 812, the plurality of clients can be from a plurality of different industries such as insurance, automobile manufacturing, pharmaceutical manufacturing, and hotel and restaurant services. As noted above, these different clients from different industries have different database formats, and an embodiment handles these different database formats in a generic and efficient manner.

At 820, the plurality of database tables is stored in a computer storage device. As noted at 822, the computer storage device can be an in-memory database. An example of an in-memory database is the SAP HANA® database. As further noted at 824, the in-memory database can be owned and maintained by a software vendor for the plurality of clients. That is, the in-memory database can be one of the products or services offered by the software vendor to its clients. Such products and services can be offered in a cloud environment, or such products and services can be implemented in a customer's environment ("on premise"). The operations 810, 820 can be referred to as a replication of a client's database tables into the environment of the software vendor.

At 830, a plurality of views is created for the database tables. Each of the views includes a plurality of fields. In an embodiment, operation 830 is executed using a database administrator's tool or a database developer's tool. It is noted that at this point, the field roles are not yet generic. The creation of the views can involve a mapping/changing of the names of columns and other features in the client's database tables so as to correlate with the columns and other features of the database tables of the generic application. However, once again, the field roles at this point are specific, not generic. The generic field roles can be set only in the generic application via a customizing/configuration operation, which is discussed herein. For example, referring again to FIGS. 2 and 3, in FIG. 3 one can see the different fields for the view in FIG. 2, which are named CLAIM, CREATE-DATE, LOSSTYPE, etc. However, the fields cannot yet be used by the generic application, since no generic field roles were defined and the names of the columns are specific for a certain industry (for example, insurance in the examples of FIGS. 2 and 3).

At 840, the plurality of views is associated with a generic application. Each of the plurality of views serves as a connection between the generic application and a particular database model of a particular client. This operation permits a user or administrator to choose the previously created views in the configuration, as is illustrated in FIGS. 2, 4, and 6.

At 850, a user is presented with one or more configuration options. These configuration options include the plurality of fields. In short, the configuration options permit a user to select a field from the views presented by the software vendor that are to be associated with one or more fields of the user's database tables.

At 860, a generic field role is defined for one or more of the plurality of fields. An example of a definition of generic field roles in the fraud management example is illustrated in FIGS. 3 and 5. As noted at 862, the generic field role includes one or more of a selection field, a key field, and a data enrichment field. The values of the selection field and data enrichment field as maintained in a database can be displayed on a user interface. At 864, it is noted that the selection field includes a column in a client database, and that the selection field is operable to function as a filter to limit the number of rows of the client database that are processed. At 866, the key field is mapped to the database views of the software vendor's database such that data from the plurality of database tables is available for use in a user interface and the data enrichment field.

In summary, a user first has to define database views. This definition of database views is performed outside of the generic application. The user then has to enter the view names into the generic application (for example, a fraud management application). Next, the fields of the view are automatically read by the generic application, and the generic application presents the fields of view to the user. Thereafter, the user can define the generic field roles for the views.

At 870, the generic application is executed using the configuration options selected by the user, and a user interface is created for a particular client or user. At this point, the generic application is now running and it uses the configuration of the views and the generic field roles to display a screen like the screen illustrated in FIG. 7. For the screen illustrated in FIG. 7, the data have already been read from the detection object view, and one of the entries for the policy product in this view is "CALIBR."

Figure 9:
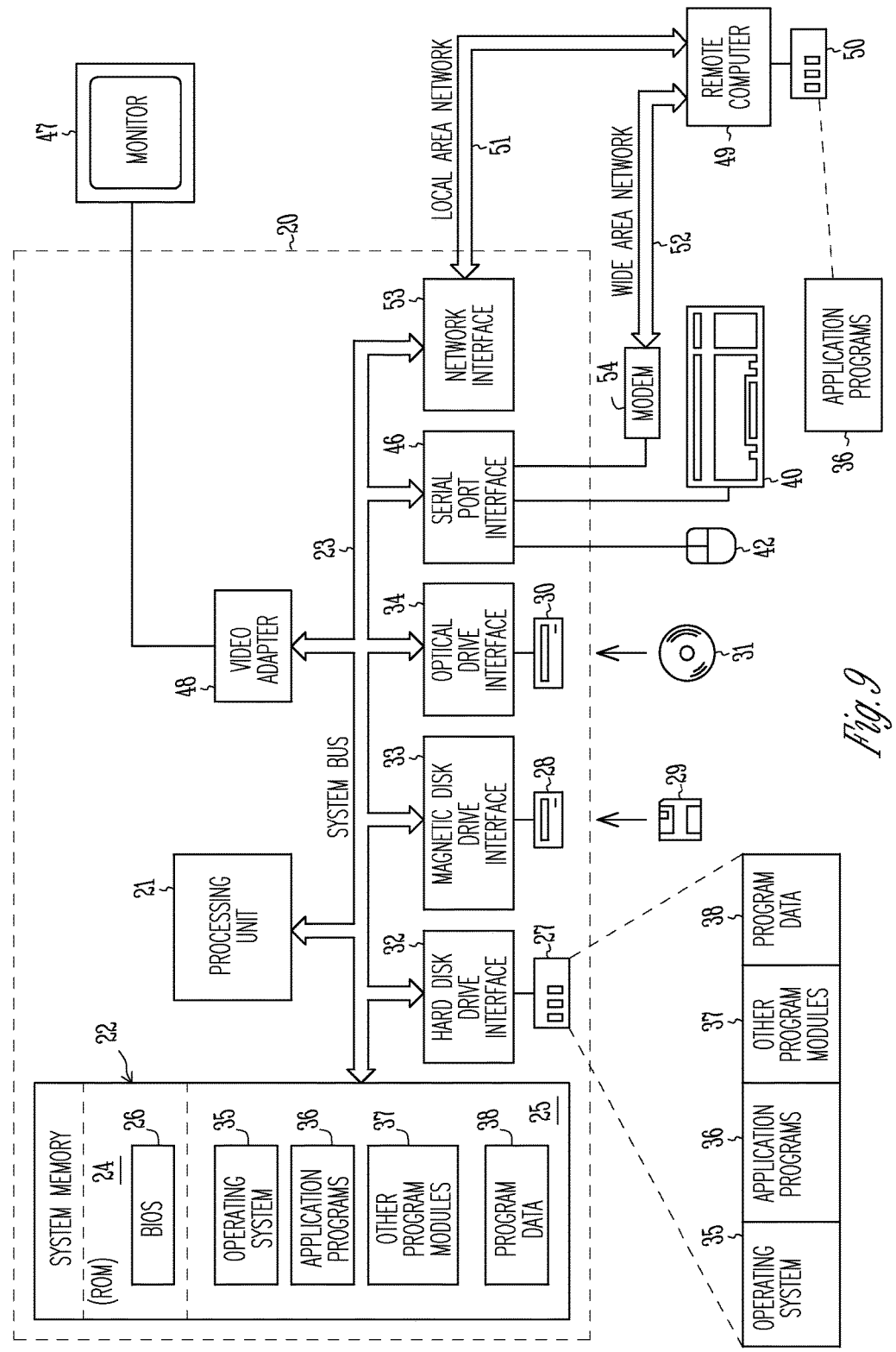
FIG. 9 is a block diagram illustrating a computer system in connection with which one or more embodiments of the present disclosure can execute.

FIG. 9 is an overview diagram of hardware and an operating environment in conjunction with which embodiments of the invention may be practiced. The description of FIG. 9 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 9, a hardware and operating environment is provided that is applicable to any of the servers and/or remote clients shown in the other Figures.

As shown in FIG. 9, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 9 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   a computer processor operable to:
      receive a plurality of database tables from a plurality of different, independent third-party clients in different industries, wherein each of the database tables comprises a database model;
      store the database tables in a computer storage device of a software vendor who services the plurality of clients using the plurality of database tables and who maintains the database tables in the computer storage device for the plurality of clients, such that the database tables of the plurality of clients are replicated into the computer storage device of the software vendor;
      create a plurality of views for the database tables, the plurality of views each comprising a plurality of fields;
      associate the plurality of views with a generic application of the software vendor, wherein the generic application is used by the plurality of clients, and wherein each of the plurality of views serves as a connection between the generic application of the software vendor and a particular database model of a particular client;
      present to a user one or more configuration options, the configuration options comprising the plurality of fields;

define a generic field role for one or more of the plurality of fields; and execute the generic application using the configuration options selected by the user and the defined generic field roles to create a user interface for the particular client.

2. The system of claim 1, wherein the plurality of clients represent a plurality of industries.

3. The system of claim 1, wherein the computer storage device comprises an in-memory database.

4. The system of claim 3, wherein the in-memory database is associated with a software vendor and maintained by the software vendor for the plurality of clients.

5. The system of claim 1, wherein the generic field role comprises one or more of a selection field, a key field, and a data enrichment field.

6. The system of claim 5, wherein the selection field comprises a column in a client database, and wherein the selection field is operable to function as a filter to limit a number of rows of the client database that are processed.

7. The system of claim 5, wherein the computer processor is operable to map the key field such that data from the plurality of database tables is available for use in a user interface and the data enrichment field.

8. The system of claim 1, wherein the system comprises a fraud management system.

9. A method comprising:
receiving a plurality of database tables from a plurality of different, independent third-party clients in different industries, wherein each of the database tables comprises a database model;
storing the database tables in a computer storage device of a software vendor who services the plurality of clients using the plurality of database tables and who maintains the database tables in the computer storage device for the plurality of clients, such that the database tables of the plurality of clients are replicated into the computer storage device of the software vendor;
creating a plurality of views for the database tables, the plurality of views each comprising a plurality of fields;
associating the plurality of views with a generic application of the software vendor, wherein the generic application is used by the plurality of clients, and wherein each of the plurality of views serves as a connection between the generic application of the software vendor and a particular database model of a particular client;
presenting to a user one or more configuration options, the configuration options comprising the plurality of fields;
defining a generic field role for one or more of the plurality of fields; and
executing the generic application using the configuration options selected by the user and the defined generic field roles to create a user interface for a particular client.

10. The method of claim 9, wherein the plurality of clients represent a plurality of industries.

11. The method of claim 9, wherein the computer storage device comprises an in-memory database.

12. The method of claim 11, wherein the in-memory database is associated with a software vendor and maintained by the software vendor for the plurality of clients.

13. The method of claim 9, wherein the generic field role comprises one or more of a selection field, a key field, and a data enrichment field.

14. The method of claim 13, wherein the selection field comprises a column in a client database, and wherein the selection field is operable to function as a filter to limit a number of rows of the client database that are processed.

15. The method of claim 13, comprising mapping the key field such that data from the plurality of database tables is available for use in a user interface and the data enrichment field.

16. A computer readable medium comprising instructions that when executed by a processor execute a process comprising:
receiving a plurality of database tables from a plurality of different, independent third-party clients in different industries, wherein each of the database tables comprises a database model;
storing the database tables in a computer storage device of a software vendor who services the plurality of clients using the plurality of database tables and who maintains the database tables in the computer storage device for the plurality of clients, such that the database tables of the plurality of clients are replicated into the computer storage device of the software vendor;
creating a plurality of views for the database tables, the plurality of views each comprising a plurality of fields;
associating the plurality of views with a generic application of the software vendor, wherein the generic application is used by the plurality of clients, and wherein each of the plurality of views serves as a connection between the generic application of the software vendor and a particular database model of a particular client;
presenting to a user one or more configuration options, the configuration options comprising the plurality of fields;
defining a generic field role for one or more of the plurality of fields; and
executing the generic application using the configuration options selected by the user and the defined generic field roles to create a user interface for a particular client.

17. The computer readable medium of claim 16, wherein the computer storage device comprises an in-memory database; and
wherein the in-memory database is associated with a software vendor and maintained by the software vendor for the plurality of clients.

18. The computer readable medium of claim 16, wherein the generic field role comprises one or more of a selection field, a key field, and a data enrichment field.

19. The computer readable medium of claim 18, wherein the selection field comprises a column in a client database, and wherein the selection field is operable to function as a filter to limit a number of rows of the client database that are processed.

20. The computer readable medium of claim 18, comprising instructions for mapping the key field such that data from the plurality of database tables is available for use in a user interface and the data enrichment field.

* * * * *